Oct. 13, 1936.　　　J. BURGGRAFF　　　2,057,229
SAFETY HITCH FOR TRACTORS
Filed Nov. 11, 1935　　　4 Sheets-Sheet 1

INVENTOR
JUSTUS BURGGRAFF
ATTORNEYS

Oct. 13, 1936.   J. BURGGRAFF   2,057,229
SAFETY HITCH FOR TRACTORS
Filed Nov. 11, 1935   4 Sheets-Sheet 4

INVENTOR
JUSTUS BURGGRAFF
BY *Paul, Paul & Moore*
ATTORNEYS

Patented Oct. 13, 1936

2,057,229

UNITED STATES PATENT OFFICE 2,057,229

SAFETY HITCH FOR TRACTORS

Justus Burggraff, Bowlus, Minn.

Application November 11, 1935, Serial No. 49,282

17 Claims. (Cl. 180—14.5)

This invention relates to new and useful improvements in tractor hitches, generally, and more particularly to safety hitches of the character disclosed in my Patent No. 1,867,726, and which, when used in connection with a tractor to propel a plow or other implement, will automatically release the plow and stop the tractor, in the event the plow engages a relatively fixed obstruction, thereby to prevent damage to the plow or implement.

An object of the invention is to provide a safety tractor hitch which is comparatively simple and inexpensive in construction, and is adapted to be extended a considerable distance, when it is released, as when subjected to an abnormal pulling force, whereby the traveling movement of the tractor may be interrupted before the plow becomes damaged.

A further object is to provide a safety hitch which normally is retained in contracted operative position, when operating under normal load, and which, when subjected to an abnormal pulling force, as when a plow being drawn engages a relatively fixed obstruction as, for example, an embedded stone or root, will automatically become inoperative to further propel the plow, and may be extended, and means being operatively connected to the plow and to the usual clutch mechanism of the tractor, whereby, when the hitch is extended, the tractor clutch will be automatically actuated to thereby interrupt the forward movement of the tractor, thereby substantially eliminating all danger of the plow becoming damaged when it thus engages an obstruction.

Other objects of the invention reside in the specific construction of the means for retaining the draft members of the hitch in contracted, operative positions, whereby shocks or jars imparted to the hitch, as a result of the plow engaging obstructions in the ground, will be partially cushioned and whereby, should the hitch be subjected to an abnormal pulling strain, said means is actuated to release the draft members and permit the hitch to elongate; in the particular arrangement of the yoke and arms which operatively connect together the two draft members, and whereby said yoke and arms may fold into operative, locked positions, when the movement of the tractor is reversed, to thereby render the hitch operable to propel the plow, when the tractor is again moved forwardly; in the means provided in connection with the hitch for operating the usual clutch operating means of the tractor to automatically interrupt traveling movement of the tractor, when the hitch is released, as when the plow strikes a relatively fixed obstruction; and, in the unique and simple construction of the hitch and the clutch operating means.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figure 1:
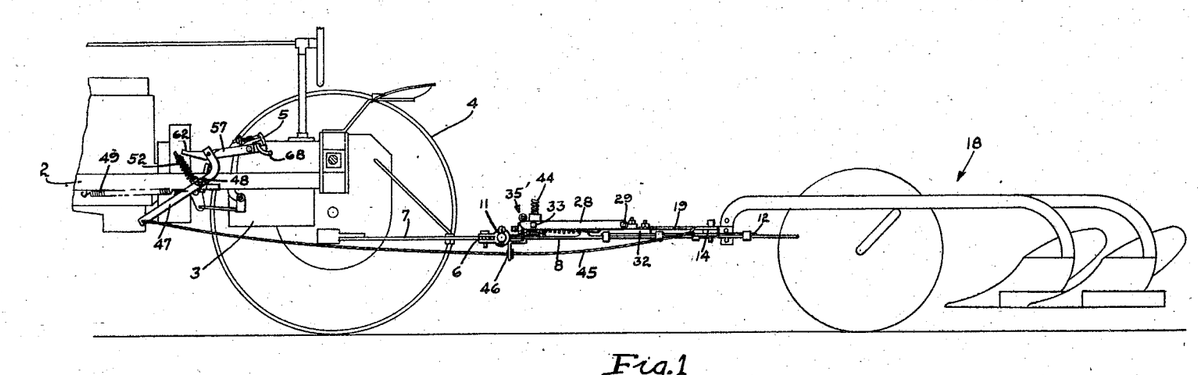
Figure 1 is a side elevational view diagrammatically illustrating a portion of a tractor and a plow coupled thereto by the novel hitch herein disclosed.

In the selected embodiment of the invention here shown, there is illustrated in Figure 1, for purposes of disclosure, the rear end portion of a tractor comprising the usual supporting frame 2, transmission case 3, traction wheels 4, and clutch pedal 5. The tractor is shown provided with the usual draw bar 6, to which the novel hitch herein disclosed is coupled.

The novel tractor hitch, herein disclosed, is best illustrated in Figures 2 to 5, inclusive, and comprises a draft member 8 provided with an eye 9 at its forward end, whereby it may be conveniently coupled to the draw bar 6 of the tractor, as indicated at 11 in Figure 1.

Figure 2:
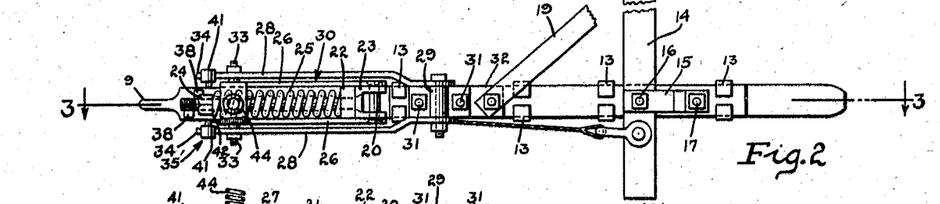
Figure 2 is an enlarged plan view of the hitch only.
Figures 3, 4, 5:
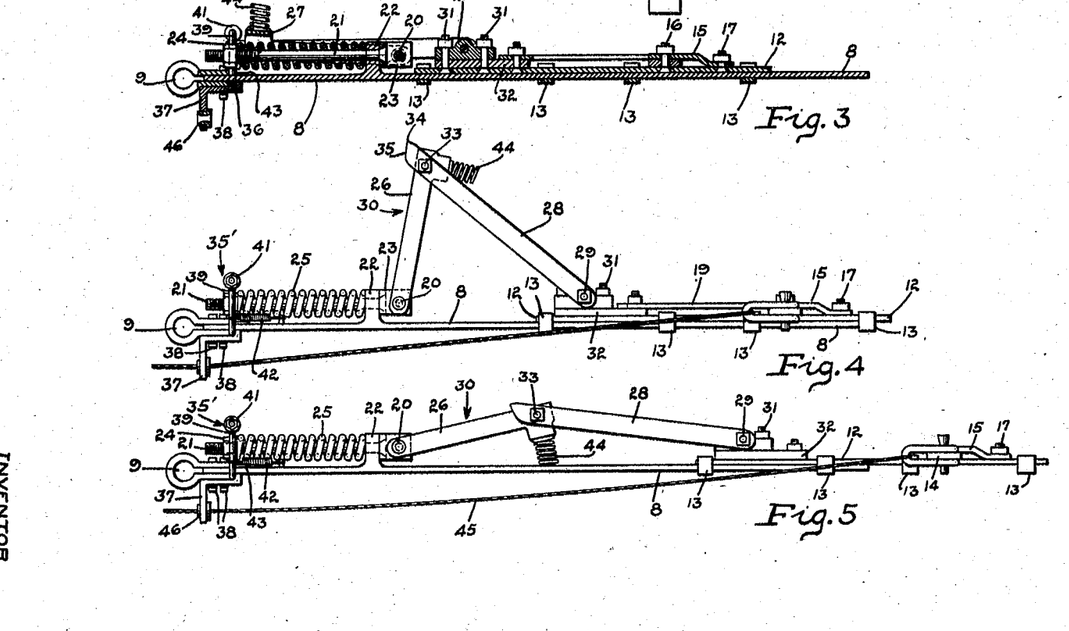
Figure 3 is a longitudinal sectional view on the line 3—3 of Figure 2, showing the hitch in contracted operative position.
Figure 4 is a side elevation of the hitch partially released.
Figure 5 is a similar view but showing the hitch fully extended.

A second draft member 12 is shown slidably supported upon the rear end portion of the tractor draft member 8, by suitable guides 13 secured to the plow member 12 and embracing the draft member 8 of the tractor. The rear portion of the draft member 12 is shown coupled to a cross member 14 by a suitable strap member 15 and bolts 16 and 17, as best shown in Figures 2 and 3. The cross member 14 may constitute a portion of the frame of the implement or plow to be propelled, generally indicated by the numeral 18 in Figure 1. A suitable diagonal brace member 19 is shown connecting the forward portion of the plow draft member 12 to the cross member 14, thereby to stiffen and brace the hitch with respect to the plow.

The tractor and plow draft members 8 and 12, respectively, are arranged for relative sliding movement, that is, the draft member 12 of the plow is slidingly engaged with the rear end portion of the tractor draft member 8 by reason of the guides or clips 13, hereinbefore described. When the hitch is in its normal position, the draft members are in the position shown in Figures 2 and 3, whereby the hitch is contracted to thereby materially reduce its overall length. In Figure 5, the hitch is shown extended.

The means provided for securing the draft members in their contracted, operative positions, is shown comprising a tension rod 21 having its rear end portion slidably supported in a guide or bearing 22 suitably secured to the draft member 8, as, for example, by welding. The tension rod 21 is shown provided with a forked head 23 at its rear end, and its opposite end is threaded to receive a nut 24 which engages one end of a suitable compression spring 25, the opposite end of which is engaged with the guide or bearing 22.

A pair of spaced parallel links 26 have their rear ends pivotally connected to the head 23 of the rod 21 and have their forward ends connected together in spaced relation by a connection 27, whereby the links 26 and connection 27 form, in effect, a yoke, whose spaced legs are adapted to fold into substantially parallel relation with respect to the compression spring 25. To simplify the explanation of the apparatus, the yoke, comprising the links 26 and connection 27 will hereinafter be referred to by the numeral 30.

A pair of spaced arms 28 have their rear end portions pivotally connected to a bearing block 29, suitably secured to the forward end of the plow draft member 12 by suitable bolts 31, as best shown in Figure 3. A suitable spacing member 32 is shown interposed between the bracket 29 and the draft member 12. The forward ends of the arms 28 are pivotally connected to the swingable end of the yoke 30 by a suitable pivot pin or bolt 33, whereby the yoke and arms 28 may fold into nested relation, as clearly illustrated in Figures 2 and 3, to thereby contract the hitch and operatively connect together the draft members.

To lock the yoke and arms in operative positions, the arms 28 are shown provided with forwardly extending terminals 34 having beveled edges 35 adapted to engage a suitable spring-actuated locking device, generally indicated by the numeral 35. This locking device, as shown in Figures 2 to 5, inclusive, is preferably U-shaped and has its lower horizontal portion 36 pivotally connected to the forward end of the draft member 8 by the rear portion of a suitable angle bracket 37, secured to the draft member 8 by suitable bolts 38. The upstanding spaced legs 39 of the locking device 35 are shown outwardly bent at their upper ends to receive a pair of anti-friction rollers 41 adapted to engage the terminals 34 of the arms 28, when the hitch is contracted, as shown in Figures 2 and 3, thereby to retain the parts in their folded operative positions. In Figure 2, it will be noted that the terminals 34 of the arms 28 are positioned beneath the rollers 41 of the locking device 35, whereby they cannot swing upwardly to release the hitch. A suitable tension spring 42 yieldably holds the locking device 35 against a suitable stop member 43, shown in Figure 3, which may be secured to the draft member 8 directly rearwardly of the locking device 35.

When the hitch is contracted, as shown in Figures 2 and 3, it will be noted that the pulling force exerted on the hitch will be transmitted from the draft member 8 of the tractor through the compression spring 25 to the draft member 12 of the plow, whereby shocks imparted to the hitch as a result of the plow engaging minor obstructions, may be absorbed in the spring 25.

Should the plow, however, engage a relatively fixed obstruction, which would prevent its further forward movement, the spring 25 will compress sufficiently to permit the forward terminals 34 of the arms 28 to move out of engagement with the locking device 35, whereby the arms 28 and yoke 30 are released and will swing upwardly and rearwardly, as shown in Figure 4, and into the positions shown in Figure 5, wherein the hitch is fully extended. By reason of the draft member 12 of the plow being operatively coupled to the tractor draft member 8 by the arms 28 and yoke 30, the draft member 12 is adapted to move or slide upon the tractor draft member 8 a distance sufficient to permit the tractor to be brought to a stop, before the hitch is fully extended, whereby damage to the plow is avoided.

Another important feature of the invention resides in the particular arrangement of the axes of the pivots 20, 29, and 33, which, as clearly illustrated in Figure 5, are so disposed that when the hitch is extened, the center pivot 33 will be out of alinement with the axes of the pivots 20 and 29. By thus arranging the pivots, when the traveling movement of the tractor is reversed, the arms 28 and yoke 30 will automatically swing upwardly, as shown in Figure 4, and subsequently into their normal folded positions, as shown in Figures 2 and 3, whereby the inclined edges 35 of the terminals 34 of the arms 28 will engage the rollers 41 of the locking device, whereby the latter is swung forwardly until the arms reach the positions shown in Figures 2 and 3, at which time the locking device will assume its locking position in engagement with the terminals 34 and thus secure the hitch in its normal contracted position.

To retain the axis of the pivot 33 at an elevation above the axes of the pivots 20 and 29, a suitable spring element 44 is shown secured to the connection 27 of the yoke 30, and is adapted to engage the draft member 8 when the hitch is extended, as best shown in Figure 5. This spring, in addition to supporting the pivot 33 at a higher elevation, also serves to cushion the impact of the portion 27 of the yoke with the draft member 8, when the hitch is suddenly released and extended, as shown in Figure 5.

Another feature of the invention resides in the means provided for automatically interrupting the forward movement of the tractor, when the hitch is released. To thus interrupt the forward movement of the tractor, means is provided for actuating the usual clutch operating member of the tractor each time the hitch is extended. In Figure 1, I have shown a tractor provided with a foot pedal for actuating the clutch. The means provided for thus actuating the clutch, is shown comprising a suitable flexible element 45 such, for example, as a wire cable, having one end secured to the cross member 14 of the plow frame, and its other end to the lower end of a lever 47, shown pivoted at 48 to the tractor frame. The cable 45 passes through a suitable guide 46, shown secured to the forward end of the tractor draft member 8, as best shown in Figure 3. A suitable spring 49 constantly urges the lever 47 into its inoperative position, shown in Figures 1 and 6.

Figure 6:
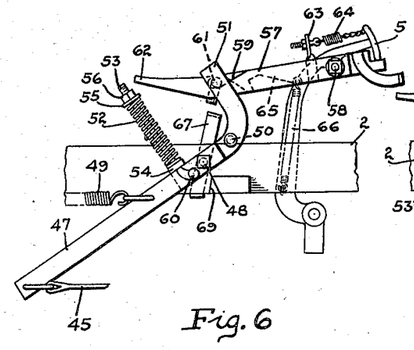
Figure 6 is a detail view showing the means for operating the usual tractor clutch pedal when the hitch is released, said means being shown in normal position.

An L-shaped arm 51 is also pivotally supported upon the pivot 48 and is normally retained by a suitable spring 52, in the position shown in Figure 6 in engagement with a stop 50. The spring 52 is shown mounted upon a rod 53, one end of which is pivotally connected to the lever 47 as shown at 60, and passes through a guide 54 provided upon the arm 51. The spring 52 has one end bearing against the guide 54 and its opposite end against a suitable washer 55 secured in position upon the rod by a nut 56. The spring 52 acts to retain the lever 47 in alinement with the lower leg of the L-shaped bracket or arm 51, as will be clearly understood by reference to Figures 6 to 9, inclusive.

A notched member 57 has one end pivotally connected to the clutch pedal 5 by a suitable pivot bolt 58, and has a suitable undercut notch 59 provided in its upper edge adapted to engage a pin 61 secured to the upper end of the L-shaped arm 51. The swinging end or nose 62 of the member 57 is preferably tapered and slightly inclined upwardly, as shown in Figures 6 to 9, the purpose of which will later be described. A small bracket 63 is secured to the member 57 and supports one end of a spring 64, the opposite end of which is suitably secured in the upper end of the clutch pedal 5, as clearly illustrated in the drawings. This spring is so adjusted that it normally holds the member 57 in a position whereby the notch 59 thereof may receive the pin 61 on the arm 51, when the above described parts are in their normal positions, as shown in Figure 6.

When the parts are thus positioned, and a pull is exerted upon the cable 45, as when the plow strikes an obstruction with sufficient force to release the hitch and cause it to extend or elongate, the lever 47 will be swung rearwardly, as a result of the continued forward movement of the tractor. Such rearward movement of the lever 47 will cause the pin 61 of the arm 51, because of said pin being engaged with the notch 59, to move the member 57 forwardly from the position shown in Figure 6, to that shown in Figure 7, thereby depressing or moving the clutch pedal into declutching position. Such actuation of the clutch pedal will interrupt the forward movement of the tractor before the hitch is extended to its maximum length, whereby damage to the plow or other implement being drawn is avoided. Should the tractor be traveling down grade at the time the plow strikes an obstruction and releases the hitch, then in some cases, the momentum of the forwardly moving tractor may cause it to over-run, or to continue to move forwardly beyond the limits of the extensibility of the hitch, whereupon the spring 25 will act to cushion the pull exerted upon the plow through the hitch, when the latter reaches the limit of its elongation, which, in most cases, will bring the coasting tractor to a standstill without damaging the plow or hitch.

Figure 9:
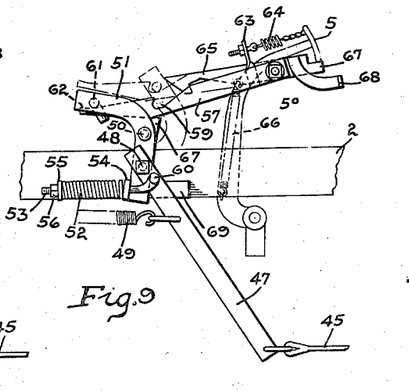
Figure 9 is a view showing the clutch pedal released from the clutch operating mechanism, whereby the tractor may be reversed to reconnect the hitch and again render it operable.
Figure 10:
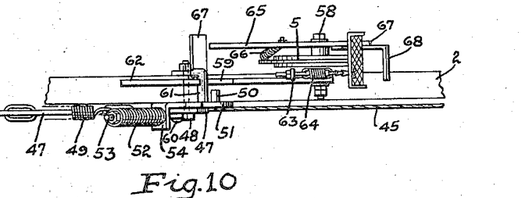
Figure 10 is a plan view of Figure 6.

A suitable hook 65 is pivotally mounted upon the pivot pin 58 of the clutch pedal, preferably at the side thereof opposite from the notched member 57, as clearly illustrated in Figure 10. This hook has a spring 66 constantly urging it downwardly into the position shown in Figures 6 to 9, inclusive, whereby the rearwardly extending terminal 67 thereof will engage the lower edges of the tread of the clutch pedal, thereby to limit its further downward movement. The hook 65 is adapted to engage the upper end of a fixed bracket 67 secured to the tractor frame, when the clutch pedal is moved forwardly into declutching position. The hook 65 is shown provided with a rearwardly extending foot engaging portion 68 positioned whereby it may be conveniently engaged by the operator's foot, thereby to disengage the hook from the fixed bracket 67, as will subsequently be described.

The novel hitch herein disclosed, will elongate approximately 24 to 30 inches, when released, which is sufficient in most cases to permit the tractor to come to a complete stop after the hitch has been released and the clutch actuated. In most cases, the extent of elongation of the hitch is sufficient to permit the tractor to slightly over-run, after the clutch pedal has been actuated, before the hitch is extended to its maximum length. The movement of the clutch pedal from clutching to declutching position, is slight, as compared to the elongation of the hitch, and to allow for this, the lever is so connected to the L-shaped arm 51 that it may move relatively thereto, after the clutch pedal has been moved into declutching position, as is clearly illustrated in Figures 6 and 7. In other words, when the lever 47 is initially operated by the cable 45, the arm 51 is moved as a unit therewith, as a result of its spring connection with the lever 47, it being understood that the tension in the spring 52 is sufficient to overcome the tension of the usual clutch spring, not shown, whereby the clutch pedal is actuated when the lever 47 is initially operated, and before the arm 51 engages a stop 69 on the tractor frame. When the lower end of the arm 51 engages the stop 69, the forward movement of the clutch pedal is interrupted, but the lever 47 will continue to swing rearwardly until the tractor comes to a stop. Such continued rearward movement of the lever 47 will be against the tension of the springs 49 and 52.

Figure 7:
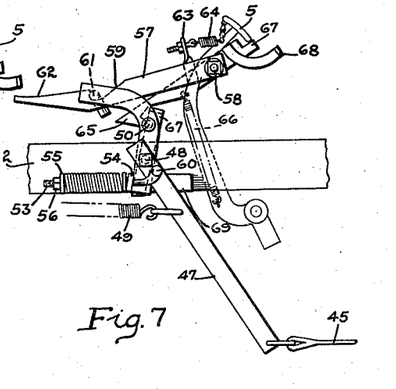
Figure 7 is a similar view showing the parts actuated to move the clutch pedal into declutching position.
Figure 8:
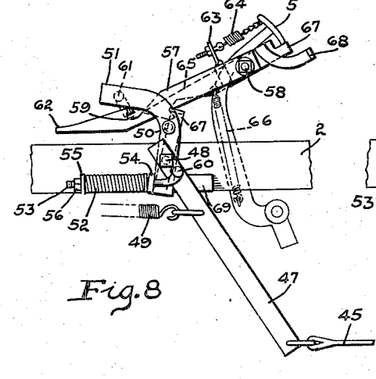
Figure 8 is a view similar to Figure 7, but showing the parts in slightly different positions.

When the clutch pedal is moved into declutching position, as shown in Figure 7, the hook 66 will be in a position to engage the bracket 67 when the notched member 57 moves out of engagement with the pin 61 of the L-shaped arm 51, as shown in Figure 8. Such engagement of the hook 66 with the bracket 67 will result when the operator slightly depresses the clutch pedal when in the position shown in Figure 7, wherein it will be noted that the spring 64 of the member 57 is slack or inoperative, so that the member 57 may drop out of engagement with the pin 61 by gravity, and allow the hook 66 to engage the bracket 67 and hold the clutch pedal in declutching position.

The long forwardly extending nose 62 of the notched member 57 prevents the latter from moving out of operative relation with the pin 61 of the L-shaped arm 51, when the movement of the tractor is reversed, as is clearly illustrated in Figure 9. In other words, when the parts are in the positions shown in Figure 8, the tractor clutch is inoperative, and before it can be rendered operative, the clutch pedal 5 must be released from the position shown in Figure 8. This, the operator may readily do by bearing down on the rearwardly extending portion 68 of the hook 66, whereby the hook 66 is moved out of engagement with the stop bracket 67, to thereby permit the clutch pedal to return to its normal clutch engaging position, shown in Figure 6. When the clutch pedal is thus moved rearwardly into clutch-engaging position, the long nose 62 of the member 57 will engage the under side of the pin 61, as shown in Figure 7, whereby the member 57 is constantly retained in operative relation with the pin 61. It is therefore essential that the member 57 be retained under the pin 61 so that the notch 59 thereof will operatively engage the pin 61, when the clutch pedal is moved forwardly.

It will thus be readily seen that the above described mechanism provides means whereby should the plow engage a relatively fixed obstruction, such as a stone or root, the hitch will be released by the abnormal pull exerted thereon, to thereby automatically release the plow and subsequently interrupt the traveling movement of the tractor before damage can be imparted to the plow or hitch.

The apparatus is comparatively simple in construction, and has been found very practical and efficient in actual use. Because of the draft members 8 and 12 of the hitch being operatively coupled together by the arms 28 and yoke 30, the hitch is capable of extending to a considerable length, as for example, 24 to 30 inches, as hereinbefore stated, which is ample to assure that the forward movement of the tractor will, in most cases, be interrupted before the hitch is extended to its maximum length.

The clutch operating mechanism on the tractor is also so constructed that damage to the clutch pedal is not likely to result, because said mechanism will move the clutch pedal forwardly only sufficiently to render the clutch inoperative, and in substantially the same manner as if it were depressed by the operator's foot. By pivotally connecting the lever 47 to the L-shaped arm 51, as hereinbefore described, whereby the lever 47 may move relatively to the arm 51, damage to the parts is not likely to result should the tractor slightly over-run after the hitch has been released and the clutch pedal actuated, because of the yieldable connection between the lever 47 and arm 51, which allows for such overrunning of the tractor after the clutch pedal has been moved into declutching position.

The particular arrangement of the yoke 30 and arms 28 of the hitch is also of considerable importance in that it provides a hitch which may be quickly rendered operative again, after it has been released because of the plow striking an obstruction, by simply reversing the traveling movement of the tractor. In other words, because of the pivot 33 being out of horizontal alinement with the pivots 20 and 29 of the hitch, when the latter is extended, as shown in Figure 5, all that is necessary to recouple the hitch or render it operative again, as shown in Figure 3, is to reverse the traveling movement of the tractor, whereby the draft member 8 of the tractor will move rearwardly with respect to the draft member 12 of the plow and the arms 28 and yoke 30 will swing upwardly, as shown in Figure 4, and automatically fold into nesting position in substantially parallel relation to the tractor draft member 8, as shown in Figures 2 and 3. The forwardly extending terminals 34 of the arms 28 will then engage the rollers 41 of the locking device 35, and become lockingly engaged therewith, as hereinbefore stated, to thereby render the hitch operative to propel the plow when the tractor is again moved forwardly.

It is also to be noted that the compression spring 26 on the rod 21 of the draft member 8, in addition to providing means for permitting the terminals 34 to move out of engagement with the stop rollers 41, when the plow strikes an obstruction, also serves as a means for cushioning the impact of the plow with the obstruction, with the result that damage to the parts of the hitch is minimized.

In Figures 11 to 14, inclusive, there is shown a tractor control mechanism applicable for use in connection with a tractor provided with a clutch lever 71 in lieu of the usual clutch pedal 5, shown in Figure 1.

Figure 11:
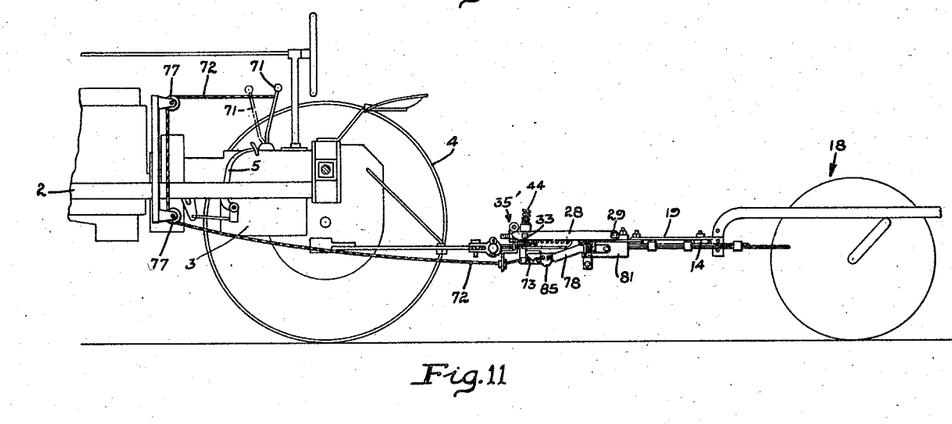
Figure 11 is a side elevational view diagrammatically illustrating a portion of a tractor provided with a clutch lever, and the means for automatically operating said clutch lever when the hitch is released, as a result of the plow striking an obstruction.

As shown in Figure 11, the clutch lever 71 has one end of a cable 72 secured thereto, the opposite end of which is secured to a suitable slide 73 mounted for sliding movement upon a suitable bar 74 having offset portions or ears 75 adapted to be secured to the tractor draft member 8 by suitable rivets or bolts 76, and whereby the bar 74 is laterally spaced from the draft member 8. The cable 72 is shown passing through suitable guide sheaves 77 on the tractor, whereby when a pull is exerted upon the cable 72, the clutch lever 71 will be swung forwardly into declutching position, as shown in dotted lines in Figure 11. The cable 72 is actuated when the terminals 34 of the arms 28 are released from the locking device 35, as when the plow strikes an obstruction.

Figure 12:
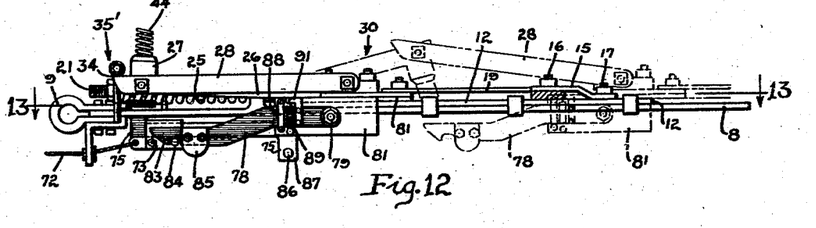
Figure 12 is an enlarged side elevational view of the hitch shown in Figure 11.

The arm 78 has a hook 83 adapted to engage a pin 84 upon the slide 73, when the draft members are in contracted, operative positions, as shown in full lines in Figure 12, whereby, when the hitch is released and the draft member 12 of the plow moves rearwardly, relatively to the draft member 8 of the tractor, the hooked terminal of the arm 78, because of being engaged with the pin 84 of the slide 73, will move the slide rearwardly upon the bar 74, whereby the cable 72 is operated to move the clutch lever 71 into declutching position.

When the clutch lever 71 has been moved into declutching position, the hooked terminal 83 of the arm 78 is moved out of operative engagement with the pin 84 of the slide by means of a cam 85, engaging a fixed pin 86 supported upon a bracket 87 of the bar 74, whereby the tractor draft member 8 may continue forwardly relatively to the plow draft member 12 until the tractor comes to a complete stop.

To retain the hooked terminal 83 in alinement with the pin 84, a suitable guide 88 is shown provided upon the bracket 81 for maintaining the hook terminal in alinement with the pin 84. A suitable spring 89 has one end secured to the bracket 81 and its opposite end to an upright member 91, secured to the arm 78, whereby the spring 89 constantly exerts a downward pressure upon the arm 78 to cause the terminal 83 thereof to operatively engage the pin 84 of the slide 73, when the hitch is contracted or, in other words, when the two draft members are moved into operative positions as shown in Figure 12.

Figure 13:
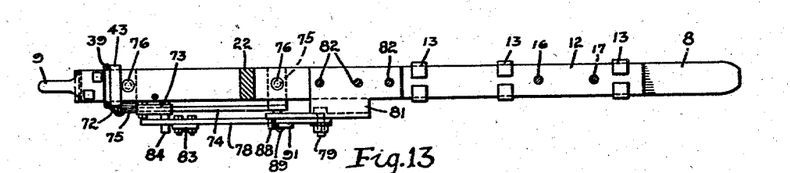
Figure 13 is a sectional plan view on the line 13—13 of Figure 12.
Figure 14:
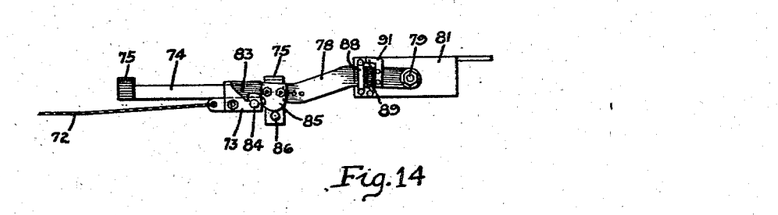
Figure 14 is a detail view showing only a portion of the operating mechanism of the hitch.

The clutch lever operating mechanism, illustrated in Figures 12, 13, and 14, is constructed independently of the clutch-operating mechanism, illustrated in Figure 1, and may be used as an attachment for the hitch, when the latter is to be used in connection with a tractor having a clutch lever instead of a clutch pedal.

When the clutch lever operating mechanism, shown in Figures 11 to 14, inclusive, is to be used in connection with the hitch, the spacing plate or member 32, shown in Figure 3, is removed and the bracket 81, shown in Figure 13, interposed between the draft member 12 and bearing block 29, as clearly illustrated in Figures 12 and 13. Thus, it will be seen that the novel hitch herein disclosed, may be used in connection with tractors provided with either a clutch lever or clutch pedal. The operation of the hitch, regardless of which clutch operating mechanism is used, is substantially the same, it being understood that the clutch operating member on the tractor is actuated by the cable 45 (or 72), each time the hitch is released to thereby interrupt the forward traveling movement of the tractor before the hitch has been extended to its maximum length.

I claim as my invention:

1. In a hitch of the class described, draft members connected together for relative sliding movement, one of said members having means for connecting it to a power vehicle and the other to a plow, means normally retaining said members in contracted operative relation comprising cooperating elements pivotally connected together at one end and having operative connections with the draft members, and whereby said elements are normally folded together adjacent to one another and in substantially parallel relation to contract the hitch, means for locking said elements in such folded positions, and means whereby the locking means is rendered inoperative, when the hitch is subjected to an abnormal pull, whereby said elements are released to permit extension of the hitch.

2. In a hitch of the class described, draft members connected together for relative sliding movement, one of said members having means for connecting it to a power vehicle and the other to a plow, means normally retaining said members in contracted operative relation comprising cooperating elements pivotally connected together and having pivotal connections with the draft members, said elements being arranged to fold into nested relation to contract the hitch, means for locking said elements in nested position, and means whereby the locking means is rendered inoperative, when the hitch is subjected to an abnormal pull, whereby the elements are released to permit extension of the hitch.

3. In a hitch of the class described, draft members connected together for relative sliding movement, one of said members having means for connecting it to a power vehicle and the other to a plow, means normally retaining said members in contracted operative relation comprising an element having one end pivotally connected to one of said draft members, and a second element pivotally connected to the other of said draft members, means pivotally connecting together the swingable ends of said elements whereby they may be folded into nested relation to contract the hitch, means for locking said elements in nested position, and means whereby the locking means is rendered inoperative, when the hitch is subjected to an abnormal pull, whereby the elements are released to permit extension of the hitch.

4. In a hitch of the class described, longitudinally extending draft members, one adapted to be connected to a tractor and the other to a plow, an arm pivotally connected at one end to the plow member, an element having one end yieldably connected to the tractor draft member, means pivotally connecting together the opposite ends of said arm and element and whereby they may be folded into nested relation when the hitch is contracted, a lock for securing the arm and element in folded positions, and means whereby when an abnormal force is applied to the hitch, said arm and element are released from the lock to permit extension of the hitch.

5. In a hitch of the class described, longitudinally extending draft members, one adapted to be connected to a tractor and the other to a plow, arms pivotally connected at one end to the plow member, a yoke having one end yieldably connected to the tractor member, means pivotally connecting together the opposite ends of the arm and yoke whereby they may be folded into nested relation, thereby to contract the hitch, and a lock on the tractor member for securing the arm and yoke in folded positions, the yieldable connection between the yoke and tractor draft member permitting the yoke to move longitudinally with respect to the tractor, when the hitch is subjected to an abnormal pull, whereby the arm and yoke are released from said lock to thereby permit the hitch to elongate.

6. In a safety hitch of the character described, draft members connected together for longitudinal sliding movement, a yoke operatively connected to one of said members, arms pivotally connected to the other of said draft members and to the yoke, said yoke and arms being adapted to fold into nested relation to contract the hitch and render it operable, a locking device for retaining the arms and yoke in folded operative positions and means adapted, upon an abnormal pull on the hitch, to effect the release of said arms and yoke from the retaining means, whereby the hitch may elongate.

7. In a safety hitch of the character described, draft members connected together for longitudinal sliding movement, resilient means mounted on one of said draft members having a yoke operatively connected thereto, arms pivotally connected to the other of said members and to the yoke, said yoke and arms being adapted to fold into nested relation to contract the hitch and render it operable, means for retaining the arms and yoke in folded relation and adapted, upon an abnormal pull on the hitch, to release said arms and yoke from the retaining means, whereby the hitch may elongate, and means whereby said resilient means must be compressed by the abnormal pull exerted on the hitch, before the retaining means can release the arms and yoke.

8. In an extensible safety hitch of the class described, draft members connected together for longitudinal sliding movement, a yoke operatively connected to one of said members, arms operatively connected to the other of said members and pivotally connected to the yoke, said yoke and links being adapted to fold into nested relation to contract the hitch and render it operable, means for retaining the arms and yoke in folded relation and adapted, upon an abnormal pull on the hitch, to release said arms and yoke from the retaining means, whereby the hitch may elongate, and means for cushioning the load imparted to the hitch.

9. In an extensible safety hitch of the class described, a draft member having means for connecting it to a tractor, a second draft member slidably associated therewith and having means for connecting it to a plow or other implement to be drawn, a spring-actuated tension rod on the plow member, a yoke having one end pivotally connected to said tension rod, arms pivotally connected at one end to the plow member and having their opposite ends pivotally connected to the yoke, whereby said arms and yoke may fold into nested relation to render the hitch operable, and a locking device engageable with said arms to secure them in operative position, said tension rod being adapted to relatively move with respect to the tractor draft member, when the hitch is subjected to an abnormal pull, whereby the arms are released from the locking device to thereby render the hitch inoperative, and whereby it may elongate.

10. In a safety hitch of the class described, draft members slidably connected together and having means for connecting them to a tractor and plow, respectively, a yoke having one end pivotally and yieldably connected to the tractor draft member, a pair of arms pivotally connected to the plow draft member and having their opposite ends pivotally connected to the swingable end of the yoke, whereby said arms and yoke may be folded into nested relation adjacent to the draft members, thereby to contract the hitch and render it operable, a locking device for securing the yoke and arms in nested or folded positions, means whereby said locking device is rendered inoperative, when the hitch is subjected to an abnormal pull, whereby the yoke and arms are released to permit the hitch to elongate, and means whereby said yoke and arms will fold into operative positions in engagement with said locking device, when the traveling movement of the tractor is reversed relatively to the plow.

11. In a safety hitch of the class described, draft members slidably connected together and having means for connecting them to a tractor and plow respectively, a yoke having one end pivotally connected to the tractor draft member, arms pivotally connected at one end to the plow draft member and having their opposite ends pivotally connected to the swingable end of the yoke, whereby said arms and yoke may fold into nested positions lengthwise of the draft members, means for locking the arms and yoke in such folded positions to render the hitch operable, means whereby the arms and yoke are released from said locking means when the hitch is subjected to an abnormal pull, and means whereby the axes of the pivotal connection between the draft members and said yoke and arms are so disposed with respect to the axis of the pivotal connection between the yoke and arms, that when the hitch is extended, and the traveling movement of the tractor is reversed relatively to the plow, said yoke and arms will automatically swing into folded positions into locking engagement with said locking means.

12. In a safety hitch of the class described, draft members connected together for longitudinal sliding movement, one having means for connecting it to a tractor and the other to a plow, resilient means mounted on one of said members and having a yoke operatively connected thereto, arms pivotally connected to the other of said draft members and to the yoke, said yoke and arms being adapted to fold into nested relation, to contract the hitch and render it operable, means for retaining the arms and yoke in folded relation and means adapted, upon an abnormal pull on the hitch, to effect the release of said arms and yoke from the retaining means, whereby the hitch may elongate, and a mechanism on the tractor for operating the clutch pedal thereof when the hitch is elongated, said mechanism comprising a lever operatively connected to the clutch pedal and having an operative connection with the plow and adapted, upon elongation of the hitch, to move the clutch pedal into declutching position and thereby stop the tractor.

13. In an extensible safety hitch of the class described, draft members connected together for longitudinal sliding movement, one having means for connecting it to a tractor and the other to a plow, a yoke operatively connected to one of said members, arms operatively connected to the other of said members and pivotally connected to the yoke, said yoke and arms being adapted to fold into nested relation to contract the hitch and render it operable, means for retaining the arms and yoke in folded relation, means adapted, upon an abnormal pull on the hitch, to effect the release of said arms and yoke from the retaining means, whereby the hitch may elongate, and means associated with the plow and having an operative connection with the clutch operating member of the tractor and adapted, upon elongation of the hitch, to move the clutch operating member into declutching position and thereby automatically interrupt traveling movement of the tractor.

14. In a hitch of the class described, draft members connected together for relative sliding movement, one of said members having means for connecting it to a tractor and the other to a plow, a locking device for normally retaining said members in contracted operative relation, means adapted, upon an abnormal pull on the hitch, to effect the release of the draft members from the locking device, whereby the hitch may elongate, a lever mounted on the tractor and operatively associated with the plow whereby, when the hitch is elongated, said lever is oscillated, a notched member pivotally connected to the clutch pedal on the tractor, and an arm movably connected to said lever and normally operatively engaged with said notched member, whereby when the lever is oscillated by elongation of the hitch, the clutch pedal is moved into declutching position to interrupt traveling movement of the tractor, the connection between said arm and lever permitting the lever to move relatively to the arm, when the clutch pedal is in declutching position.

15. In a hitch of the class described, draft members connected together for relative sliding movement, one of said members having means for connecting it to a tractor and the other to a plow, means for normally retaining said members in contracted operative relation, means adapted, upon an abnormal pull on the hitch, to effect the release of the draft members, whereby the hitch may elongate, a lever mounted on the tractor and operatively associated with the plow whereby, when the hitch is elongated, said lever is oscillated, a notched member pivotally connected to the clutch pedal on the tractor, an arm movably connected to said lever and normally operatively engaged with said notched member, whereby when the lever is oscillated by elongation of the hitch, the clutch pedal is moved into declutching position to interrupt traveling movement of the tractor, the connection between said arm and lever permitting the lever to move relatively to the arm, when the clutch pedal is in declutching position; and means associated with said notched member for retaining the clutch pedal in declutching position independently of the lever and arm.

16. In a hitch of the class described, draft members connected together for relative sliding movement, one of said members having means for connecting it to a tractor and the other to a plow, means for normally retaining said members in contracted operative relation, means adapted, upon an abnormal pull on the hitch, to effect the release of the draft members, whereby the hitch may elongate, a spring-actuated lever pivotally mounted on the tractor and having an operative connection with the plow, a notched member pivotally mounted upon the clutch pedal of the tractor, an L-shaped arm movably connected to the lever and operatively engaged with said notched member and adapted, upon swinging movement of the lever, to move the clutch pedal into declutching position, the connection between said arm and the lever permitting the lever to move relatively to the arm, when the clutch pedal is in declutching position and means for locking the clutch pedal in declutching position independently of the notched member.

17. In a hitch of the class described, draft members connected together for relative sliding movement, one of said members having means for connecting it to a tractor and the other to a plow, means or normally retaining said members in contracted operative relation, means adapted, upon an abnormal pull on the tractor, to effect the release of the draft members, whereby the hitch may elongate, a spring-actuated lever pivotally mounted on the tractor and having an operative connection with the plow, a notched member pivotally mounted on the clutch pedal of the tractor, an arm movably connected to said lever and operatively engaged with said notched member and adapted, upon swinging movement of the lever, to move the clutch pedal into declutching position, means for locking the clutch pedal in declutching position independently of the notched member, said locking means being manually operable to release the clutch pedal to permit it to return to clutching position, and means for retaining the notched member in operative relation to said lever regardless of the position of the clutch pedal, said lever and notched member cooperating to render the tractor clutch inoperative when the plow strikes an obstruction and the hitch is elongated.

JUSTUS BURGGRAFF.